Patented Aug. 15, 1950

2,518,672

UNITED STATES PATENT OFFICE 2,518,672

TETRAHYDROXY ETIOCHOLANIC ACID AND ESTERS THEREOF

Maximilian R. Ehrenstein, Philadelphia, Pa., assignor to The Trustees of The University of Pennsylvania, Philadelphia, Pa., a corporation of Pennsylvania No Drawing. Application April 30, 1946, Serial No. 666,191

3 Claims. (Cl. 260—397.1)

This invention relates to certain 3,5,14,19-tetrahydroxy-etiocholanic acid derivatives and the acid itself. More particularly it concerns the free acid and its 3,19-diacyl esters, and the methyl ester of both the free acid and the 3,19-diacyl esters.

The products of the invention are useful as intermediates in the preparation of other compounds, and some of them have certain therapeutic effectiveness.

The products of the invention may be illustrated by, but not restricted to, the following:

Example 1—3,5,14,19-tetrahydroxy-etiocholanic acid 3,19-diacetate.—To 5.0 grams of strophanthidol-3,19-diacetate (melting point between 180–190° C.) dissolved in 294 cc. of acetone there was added 4.84 grams of finely ground potassium permanganate. The mixture was shaken in a glass stoppered bottle on a shaking machine for a period of about two hours, after which time the permanganate color had completely disappeared. The reaction mixtures originating from three such oxidations of a total of 16.1 grams of strophanthidol diacetate were transferred into a distilling flask and the acetone removed from the brown suspension by distilling initially at low vacuum and later at higher. To the residue was added about 50 cc. of water to produce a sludge which was transferred into a separatory funnel and then acidified to Congo paper by slowly adding about 100 cc. of approximately 10% sulfuric acid. The brown suspension was extracted in a separatory funnel once with 200 cc. of ether and then seven times with 150 cc. each of it. These ether extracts were all combined (designated below "combined ether extracts"). Thereafter, the brown suspension was extracted twice with 150 cc. of ethyl acetate and six times with 100 cc. each of the acetate. The ethyl acetate extracts were all combined (designated below "combined ethyl acetate extracts").

The combined ether extracts were extracted in a separatory funnel first with 50 cc., and then 25 cc., of a 5% solution of sodium carbonate and then washed three times with 10 cc. each of water. The separated sodium carbonate layers and the three aqueous washings were combined and held for working up. The thus washed ether layer was dried with sodium sulfate overnight, filtered, and then taken down completely to dryness under a vacuum. The residue (called below the ether extract neutral material) was a brittle foam which weighed 5.976 grams, after drying in a vacuum desiccator. The combined sodium carbonate and water washings was made acid to Congo paper by slowly adding to it in a separatory funnel about 40 cc. of 10% sulfuric acid which caused a sticky precipitate to appear. The suspension was thoroughly extracted in sequence with 200 cc., 150 cc., and five times with 100 cc. each of ether. These ether extracts were combined, washed eight times with 8 cc. each of water and finally dried overnight with sodium sulfate. This dried ether phase (acid ether) was then filtered, concentrated, and then brought down completely to dryness under vacuum. The residue (called below the ether extract acid material) was a brittle foam which, after drying in a vacuum desiccator over KOH, weighed 7.1872 grams.

The combined ethyl acetate extracts were extracted in a separatory funnel first with 30 cc., and then 15 cc., of a 5% sodium carbonate solution and subsequently washed three times with 10 cc. each of water. The sodium carbonate and the three aqueous washings were combined and held for working up. The thus washed ethyl acetate layer was dried with sodium sulfate, filtered and then brought down completely to dryness under vacuum. The residue (called below the ethyl acetate neutral material) was a brittle foam weighing 0.558 gram after drying in a vacuum desiccator over KOH. The combined sodium carbonate and water washings was acidified to Congo paper by slowly adding to it in a separatory funnel about 35 cc. of 10% sulfuric acid, and then was very thoroughly extracted five times with 100 cc. each of ethyl acetate. The ethyl acetate layers from these extractions were combined and washed twice with 8 cc. each of water and six times with 5 cc. each of water and dried with sodium sulfate, and then was filtered, concentrated and finally brought to dryness under vacuum. This residue (called below the ethyl acetate acid material), after drying over KOH in a vacuum desiccator, weighed 0.227 gram.

Accordingly, the two acid material residues obtained amounted to a total yield of 7.414 grams of crude 3,5,14,19-tetrahydroxy-etiocholanic acid 3,19-diacetate, a dry, solid, brittle, resinous substance, having the structural formula

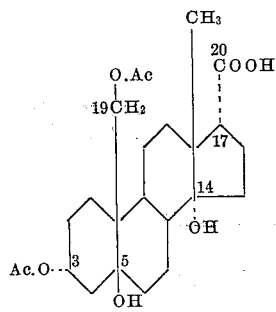

Both the ether extract acid material and the ethyl acetate acid material resisted all attempts at crystallization. So also did the pooled ether extract neutral material and ethyl acetate extract neutral material. However, on subjecting the latter pooled material to chromatographic adsorption, an amount of crystalline strophanthidol diacetate, approximately 50 per cent, or possibly somewhat more, of the pooled neutral material, was obtained.

In repeat runs it was found that the crude pooled (ether extract and ethyl acetate extract) neutral material may be subjected to further oxidation with potassium permanganate under conditions analogous to those of the first oxidation with the exception that the ratio of potassium permanganate used was cut down to about two-thirds of what it was in the original oxidation. The amount of acid material residue (from ether extract) thus obtained amounted to about seven-tenths of the corresponding fraction obtained from the oxidation of the original starting strophanthidol diacetate.

While in this Example 1 strophanthidol-3,19-diacetate is used as the starting material, it may be replaced similarly by other strophanthidol-3,19-diacyl esters, such as those obtained from carboxylic acids inert to oxidation by alkali metal permanganates, as the aliphatic acids, particularly those that are monohydric and have no other substituent groups, for example, the lower alkyl monohydric acids containing no other substituent groups, as well as similar aralkyl acids as benzylic acid, and aromatic acids as benzoic acid.

Also, while acetone was used as the solvent for the starting material in Example 1, there may be used any other suitable solvent for any of the applicable strophanthidol-3,19-diacyl ester starting materials so long as the solvent is inert to both the starting material and the oxidizing agent.

While potassium permanganate has been used as the oxidizing agent in Example 1, any other suitable oxidizing agent may be used so long as it will oxidize the unsaturated lactone ring, linked to the carbon in the 17-position, to a carboxyl group such as preferably any other suitable alkali metal permanganate, and also chromic acid or ozone. Moreover, the ratio of the alkali metal permanganate to the strophanthidol diacyl ester starting material need not be fixed to that used in Example 1 for the amount of the permanganate may be varied to alter the portion of the crude pooled (ether extract and ethyl acetate extract) neutral material available for further oxidation as above described.

*Example 2—3,5,14,19 - tetrahydroxy - etiocholanic acid.*—To a solution of 3.0 grams of the crude 3,5,14,19-tetrahydroxy - etiocholanic acid 3,19-diacetate (from the ether extract) in 15 cc. of methanol was added a solution of 4.5 grams of potassium hydroxide in 60 cc. of methanol. Immediately thereafter the resulting mixture was refluxed on a water bath for thirty minutes, and then to it was added 150 cc. of water, and the solution was immediately concentrated in vacuum (at 45–50° C.) to a volume of about 65 cc. The solution was cooled by immersing its container in an ice-bath, and it was then made acid to Congo paper by slowly adding 7.5 cc. of concentrated hydrochloric acid which caused a precipitate to appear. The reaction mixture was then thoroughly extracted eight times with 100 cc. each of ethyl acetate. (Further extraction will probably increase somewhat the yield of the saponification product.) The combined ethyl acetate extracts were washed eight times with 5–6 cc. each of water and then dried with sodium sulfate. After filtering, the solution was concentrated under vacuum (at 40–50° C.) to about 40–45 cc. In this concentration the deacetylated acid apparently formed a super-saturated solution. The reaction product separated in a micro-crystalline form upon heating the solution briefly on a water bath and scratching the walls of the container. After standing overnight at room temperature, the almost white micro-crystalline material was filtered and thoroughly washed with ethyl acetate. Yield: 1.42 grams, melting at 208–210° C. (followed by effervescence). (In some other runs, on concentrating the filtrate, it occasionally furnished further small amounts of the crystalline end product.) This filtrate was also brought to dryness under vacuum (at 40–50° C.) and furnished a brittle foam, which, after drying in a vacuum desiccator over KOH, weighed 0.89 gram. This material also contained 3,5,14,19-tetrahydroxy-etiocholanic acid, because on esterifying it with diazomethane and subjecting the esterification product to chromatographic adsorption, an amount of the crystalline methyl ester of the desired acid can be obtained, which methyl ester is described in Example 3.

The crystalline 3,5,14,19-tetrahydroxy-etiocholanic acid, as obtained above from the combined ethyl acetate extracts, was dissolved, while heating under a reflux condenser, in acetone and then concentrated to a small volume over the water bath, after which on standing at room temperature separation of glistening platelets began rather soon. They were filtered after standing overnight. The thus recrystallized 3,5,14,19-tetrahydroxy-etiocholanic acid (melting at 217–218.5° C. followed by effervescence) has the formula

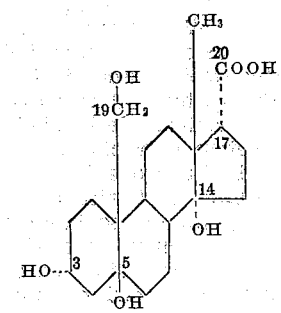

*Example 3—methyl ester of 3,5,14,19-tetrahydroxy-etiocholanic acid.*—About 0.12 gram of the acid of Example 2 obtained after the recrystallization from acetone was dissolved in 14 cc. of acetone, with heating under reflux condenser, and the solution was concentrated to about two-thirds of this volume on the water bath. To this solution was added at 0° C. the amount of an ethereal solution of diazomethane sufficient to produce a persistent yellow color. After brief standing at room temperature, the excess of diazomethane was evaporated off over a water bath and the solution then brought to dryness under vacuum (at 40–45° C.). The residue was a brittle foam which was transferred into a separatory funnel by means of a total of 40 cc. of ether. The ether solution was washed successively with 3 cc. of normal hydrochloric acid, 3 cc. of water, 3 cc. of a 5% sodium carbonate solution, and three times with 3 cc. each of water. After drying with sodium sulfate, the solution was filtered and brought to dryness, the final drying being under vacuum. The residue was a colorless resin which became almost completely crystalline after a few days standing in a vacuum desiccator. Yield: 0.091 gram. This material was recrystallized by dissolving it in acetone and slowly adding at room temperature some petroleum ether. The separation of spear-shaped crystals began very soon. The crystalline methyl ester of 3,5,14,19-tetrahydroxy-etiocholanic acid, whose structural formula is

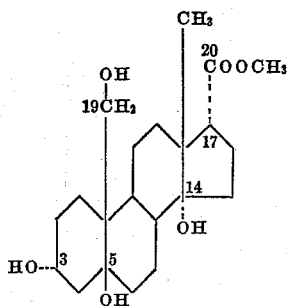

was filtered on the following day. Yield: 0.053 gram, melting at 168–169° C. More crystalline ester was secured from the mother liquor.

Other esters of 3,5,14,19-tetrahydroxy-etiocholanic acid are similarly obtained by replacing the diazomethane of Example 3 by the corresponding diazo reagent, R—N₂, in which R is the hydrocarbon radical replacing the methyl group in the methyl ester of the example, such as reacting said acid starting material under reaction conditions as in Example 3 with the required corresponding diazoalkane, or with the desired corresponding diazo(lower)alkane as diazoethane, diazopropane, diazobutane, and the like, or by reacting the starting material with the desired corresponding aryl diazonium salt to introduce the desired aryl group when R is aryl, for example, with a phenyl diazonium halide as the chloride and the like. The corresponding esters, both when R is an alkyl as well as an aryl hydrocarbon, can be made by the common procedure of esterifying the carboxyl group with an alcohol which procedure is employed when it is desired to replace the methyl group of the ester of Example 3 by an aralkyl group as benzyl, for example, by esterification with benzyl alcohol.

*Example 4—methyl ester of 3,5,14,19-tetrahydroxy-etiocholanic acid 3,19-diacetate.*—Since the 3,5,14,19-tetrahydroxy-etiocholanic acid 3,19-diacetate, end product of Example 1, resisted all attempts at crystallization as stated in that example, to 50 milligrams of the pure crystalline 3,5,14,19-tetrahydroxy-etiocholanic acid end product of Example 2, dissolved in 0.4 cc. of pyridine, there was added 0.2 cc. of acetic anhydride. The mixture was allowed to stand overnight at room temperature and was then worked up in the customary manner. There was obtained a combined total of about 33 milligrams of a dry, solid, brittle, colorless resin, as in Example 1, and which likewise resisted all attempts at crystallization.

The resinous diacetate just obtained was treated in an ethereal solution with diazomethane in the manner described in Example 3, and the reaction product isolated as in that example. The yield was 27 milligrams of a solid, dry, colorless, resin, of the formula

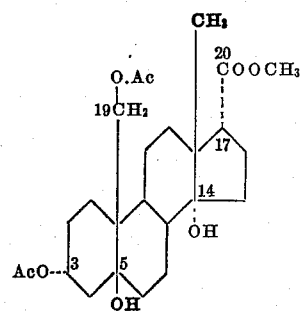

from which even by means of chromatographic adsorption no crystalline material could be secured.

In similar manner, by starting with any other 3,5,14,19-tetrahydroxy-etiocholanic acid 3,19-diacyl ester starting material, obtained as discussed in connection with Example 1, there is obtained the corresponding methyl ester of 3,5,14,19-tetrahydroxy-etiocholanic acid 3,19-diacyl ester. Likewise, if the diazomethane is replaced by a corresponding diazoalkane or aryl diazonium halide, as referred to in Example 3, the corresponding ester with the selected alkyl or phenyl group replacing the methyl group of the ester is obtained. As described in relation to Example 3, the replacement may also be done by the common esterification with the corresponding alkyl or aralkyl alcohol, or phenol.

The term "ester" used in the specification and claims is used in its commonly accepted sense as restricted to an ester resulting from the use of a carboxylic acid. It is in that common, restricted sense that the term "acyl" is also used, so that "acyloxy" is similarly confined by the meaning of "acyl."

The products obtained by the process described in this Example 4 are also obtainable by acylating the corresponding product of the type produced according to Example 3 in the same manner in which the product of Example 2 was acylated to produce also the product of Example 1.

It will be understood, with reference to the several compounds illustrated and described above, that I do not intend that this invention or the claims appended hereto shall be limited to any particular stereo-chemical configuration about any carbon atom and, in particular, about carbon atoms 3, 5, 10, 14 and 17.

What is claimed is:

1. A 3,5,14,19-tetrahydroxy-etiocholanic acid compound of the general formula

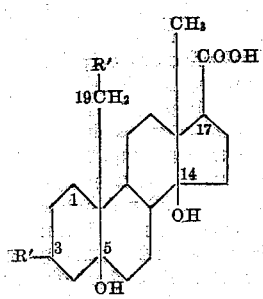

in which R' is selected from the group consisting of —OH and esters derived from lower alkyl monohydric acids containing no other substituent groups.

2. 3,5,14,19 - tetrahydroxy - etiocholanic acid, having the structural formula

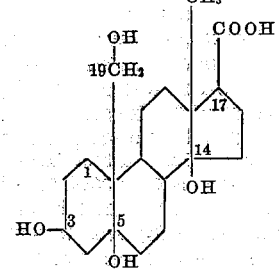

3. 3,5,14,19 - tetrahydroxy - etiocholanic acid 3,19-diacetate.

MAXIMILIAN R. EHRENSTEIN.

REFERENCES CITED

The following references are of record in the file of this patent:

Sobotka, Chemistry of the Sterids, 1938, page 585.

Karrer, Organic Chemistry, 2nd edition, 1946, page 698.